United States Patent [19]

Artrip et al.

[11] 4,057,752

[45] Nov. 8, 1977

[54] FIRING CONTROL OSCILLATOR FOR A SOLID STATE SWITCH

[75] Inventors: Robert W. Artrip, Northfield; Robert G. Klimo, Parma, both of Ohio

[73] Assignee: Towmotor Corporation, Mentor, Ohio

[21] Appl. No.: 626,610

[22] Filed: Oct. 28, 1975

[51] Int. Cl.² .............................................. H02P 7/00
[52] U.S. Cl. .................... 318/345 B; 318/139; 318/341; 323/18
[58] Field of Search ............ 318/139, 415, 345 A, 318/345 B, 341, 391; 323/18

[56] References Cited

U.S. PATENT DOCUMENTS

| | | | |
|---|---|---|---|
| 3,361,921 | 1/1968 | Montross et al. | 318/139 |
| 3,484,652 | 12/1969 | Thiele | 318/341 |
| 3,593,075 | 7/1971 | Pantelakis | 318/391 |

*Primary Examiner*—David Smith, Jr.
*Attorney, Agent, or Firm*—Phillips, Moore, Weissenberger, Lempio &Majestic

[57] ABSTRACT

An oscillator for use in a silicon controlled rectifier (SCR) control for direct current powered loads and for repeatedly gating on the main SCR of the control at an operator-selected frequency. Operation of the oscillator is delayed on start-up to avoid erratic operation due to contact bounce. The pulse frequency of the oscillator increases and decreases linearly at different settable rates even though the accelerator control is abruptly changed. The oscillator is automatically turned off in the event the load is to be disconnected from the power source so that the disconnection will not break current.

14 Claims, 1 Drawing Figure

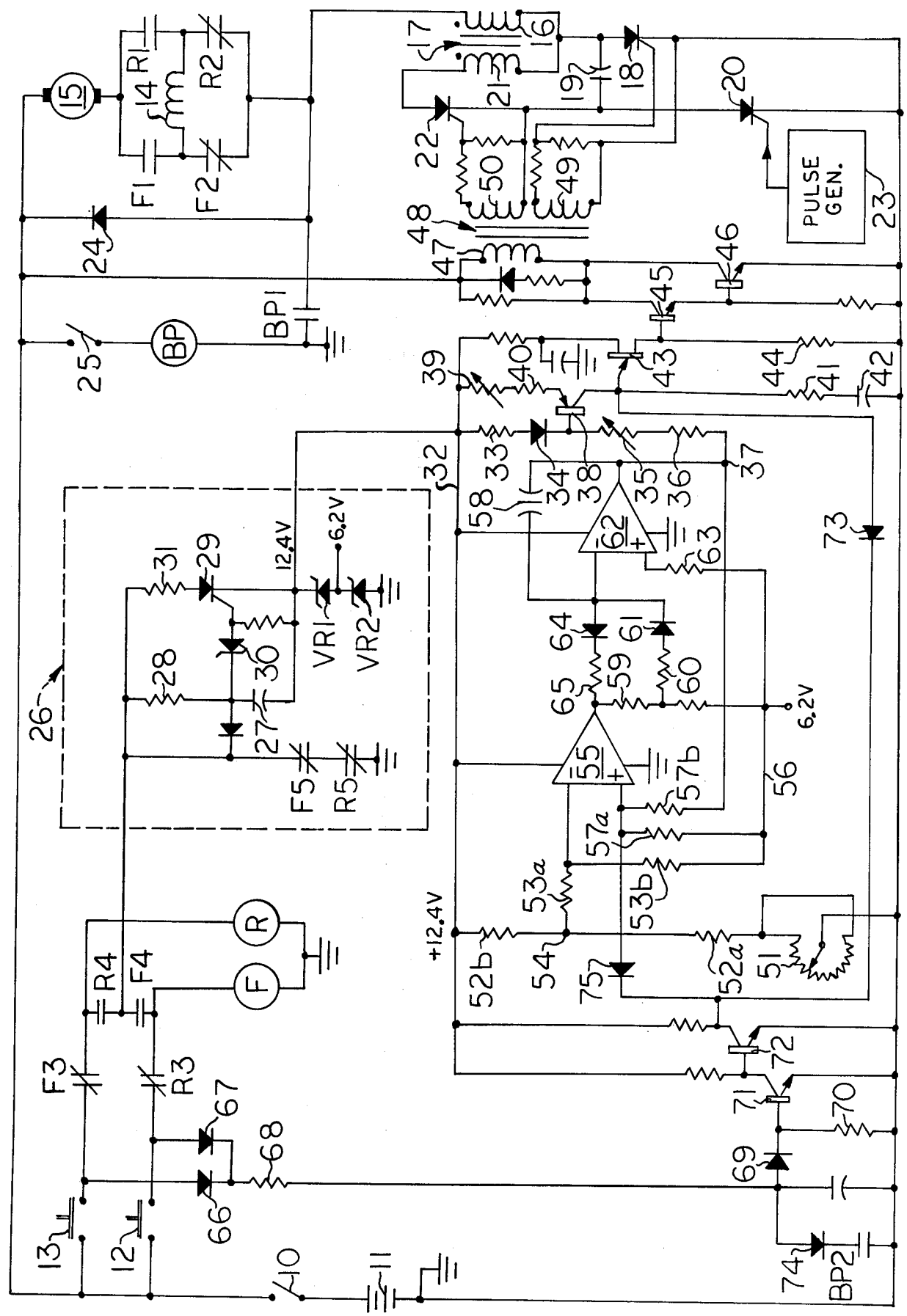

FIRING CONTROL OSCILLATOR FOR A SOLID STATE SWITCH

BACKGROUND OF THE INVENTION

This invention relates to a control circuit utilizing silicon controlled rectifiers (SCR's) for controlling the operation of a series motor powered from a direct current source.

It is well known that the direct current supplied to a load, such as a direct current motor, from a power source, such as a battery, may be selectively varied by controlling the average power delivered to the load, and that a solid state SCR can be used as a switching device to repeatedly connect and disconnect the battery to and from the load. The power supplied to the load is determined by the ratio between the time the SCR is turned on and is conducting and the time the SCR is turned off and is non-conducting.

Turning the SCR repeatedly on and off will allow a series of pulses of current to flow through the load, the frequency of pulses being determined by the number of times the SCR is turned on per unit time and the duration, or width, of the pulses being determined by the length of time that the SCR remains on before it is turned off. If the pulse width remains constant, as it does in the present invention, the ratio of on-time to off-time will vary directly as the frequency of the pulses. As the pulse frequency increases, the off-time between the time the SCR is turned off and the time it is turned back on will decrease, and more power will be delivered to the load.

Typically, SCR control systems include a main SCR which is connected in series with the load, and a pulse generator which repeatedly supplies gate pulses to turn the main SCR on, at a rate controlled by the operator. A commutating capacitor is provided which will charge in a commutating direction through a charging SCR. The charging of the commutating capacitor is typically done when the main SCR is conducting. At the appropriate time, a commutating SCR is turned on to connect the charged capacitor across the main SCR and divert the current therefrom so that the main SCR is reversely biased and will turn off.

Several problems have arisen in the use of the SCR motor controls when used for series-connected direct-current motors used to propel vehicles, such as fork-lift trucks.

First, in starting up, bounce or erratic switch closure noise may cause erratic application of power to the motor through the main SCR.

Secondly, in vehicle controls the main oscillator which delivers gate pulses to turn the main SCR on is usually controlled by a foot-operated accelerator pedal which actuates a variable resistor, coupled to the pedal, to vary the frequency of the oscillator in response to changes in resistance of the resistor. Smoother motor control, maximum operator comfort and greatest efficiency of operation will occur if the resistance is gradually and smoothly increased on acceleration or decreased on deceleration. However, many operators do not operate vehicles in that way. They will abruptly depress the accelerator when they wish additional speed or will abruptly release the pedal when they wish to decelerate.

Thirdly, in the operation of vehicles, and particularly fork-lift trucks, the direction of the vehicle may be repeatedly reversed by switching the direction that the current flows through the field winding of the motor. If the main SCR continues to deliver current to the motor during such directional changes the contacts which connect the field winding to the armature for one direction will break current upon opening and power will be applied to the motor immediately upon closure of the contacts for establishing the reverse condition causing the vehicle to lurch.

SUMMARY OF THE INVENTION

The present invention provides a main oscillator for the main SCR of an SCR control for a series-connected direct current motor.

In order to safeguard against erratic start-up, power to the timing circuit of the main oscillator is applied through auxiliary contacts of the direction relays and the power is delayed for a predetermined time period after closure of those contacts.

In order to provide for a smooth application of power, greater operator comfort and maximum efficiency, a circuit is interposed between the foot-operated variable resistance and the timing circuit which provides a linear change in frequency of the main oscillator on acceleration or deceleration even though the resistance may be abruptly changed by the operator. The rate of change of the oscillator frequency is independent for acceleration and deceleration and thus the control may be designed with different rates for acceleration and deceleration so that maximum performance may be achieved.

In order to prevent vehicle lurching when the direction of current through the field winding is reversed, the main oscillator is disabled at such time so that the main SCR will not be gated on, and no current will be flowing through the field when the contacts connecting it to the armature are opened.

Other objects and advantages will become apparent in the course of the following detailed description.

BRIEF DESCRIPTION OF THE DRAWINGS

The single FIGURE is a schematic diagram of an SCR control system for a series motor powered from a direct current source utilizing a main oscillator in accordance with the present invention.

DESCRIPTION OF THE PREFERRED EMBODIMENT

Referring now to the drawing, wherein is shown a preferred embodiment of the invention, a main switch 10 enables a source of direct current, e.g., battery 11, to be connected to the circuit. Direction switches 12 and 13 are provided to alternatively energize one of the forward (F) or reverse (R) relay coils, to connect the field winding 14 in series with the armature 15 by means of the forward contacts F1 and F2 or the reverse contacts R1 and R2. Energization of the forward relay coil F or the reverse relay coil R will actuate all of the forward contacts F1 through F5 or R1 through R5 from the normal position shown in the drawing. With master switch 10 and one of the switches 12 or 13 closed, a current path is provided from the battery through the armature 15 and field winding 14, the primary 16 of pulse transformer 17 and the main silicon controlled rectifier (SCR) 18.

A commutating capacitor 19 is connected in series with a commutating SCR 20, the capacitor 19 and SCR 20 being in parallel with the main SCR 18. A charging path for the capacitor 19 is provided by the loop comprised of capacitor 19, the secondary 21 of pulse transformer 17 and the charging SCR 22.

In operation, pulses from the main pulse generator, to be hereinafter described, are applied to the gates of the main and charging SCR's 18 and 22. With the main SCR gated on, current will flow through the motor and the primary of pulse transformer 17. Current flow will be induced in the secondary 21 and will flow through SCR 22 to charge the commutating capacitor 19 so that its left plate is charged positively relative to its right plate. When the capacitor is so charged SCR 22 will commutate.

Subsequently, a pulse is applied from pulse generator 23 to the gate of the commutating SCR 20 to turn it on and connect capacitor 19 across the main SCR 18 so that the charge on the capacitor will commutate the main SCR. Preferably, the pulse generator 23 will deliver a pulse to the commutating SCR 20 a fixed time after the main SCR 18 is gated on. Current through the motor is maintained while the main SCR is off by means of the flyback diode 24.

The main and charging SCR's 18 and 22 will then be gated on to start another cycle of operation. Thus, if the main SCR is commutated at a fixed time after it is gated on, the power delivered to the motor will vary directly in accordance with the frequency at which the main SCR is gated on.

If it is desired to operate the motor so that full battery potential is applied to the motor terminals, switch 25 is closed to energize the bypass relay BP and actuate the main and auxiliary contacts BP1 and BP2 thereof. The main contacts BP1 will short out the SCR control system and apply full power to the motor. Typically, switch 25 is actuated to closed position when the accelerator pedal of the vehicle is fully depressed.

When the master switch 10 and one of the direction switches, e.g., forward switch 12, is closed so that the forward relay coil F is energized, power is applied through the now-closed contacts F4 to the start-up timer 26. When power is so applied, capacitor 27 begins to charge through resistor 28. When the voltage across capacitor 27 reaches a high enough level, the gate of SCR 29 is forward-biased by current through zener diode 30 so that SCR 29 turns on. Flow through resistor 31, SCR 29 and zener diodes VR1 and VR2 thus develops regulated but delayed voltages of 12.4 v. and 6.2 v. for use in the main oscillator and its related circuits. The start-up timer 26 will be reset each time the direction of the vehicle is to be changed, since at such time the F5 and R5 contacts will both be closed, and thereby will ground, and reset, capacitor 27.

The delayed and regulated 12.4 volts is applied to bus 32 and causes current to flow through resistor 33, diode 34, variable resistor 35 ("creep speed" adjustment) and resistor 36 to junction 37. The base of transistor 38 is connected to the junction of diode 34 and variable resistor 35, and a parallel flow is established from bus 32 through variable resistor 39 (main frequency adjustment), resistor 40, transistor 38, resistor 41 and timing capacitor 42. The collector current of transistor 38 is directly proportional to the voltage drops across resistors 39 and 40 and inversely proportional to the total resistance of those resistors. The voltage across resistors 39 and 40 is also equal to the voltage drop across resistor 33 (the voltage drop across the base-emitter junction of transistor 38 being canceled out by the voltage drop across diode 34).

A voltage across resistor 33 is developed by the voltage difference between the 12.4 volt bus 32 and junction 37, this voltage being proportional to the voltage difference and inversely proportional to the total resistance between bus 32 and junction 37. When the junction 37 is close in potential to the 12.4-volt bus, the voltage drop across resistor 33 is minimum, the minimum level of voltage across resistor 33 being controlled by adjustment of the "creep speed" variable resistor 35.

Increasing the voltage drop across resistor 33 will develop a larger voltage drop across resistors 39 and 40, causing more collector current in transistor 38. This increases flow through resistor 41 and timing capacitor 42. Thus, increasing or decreasing the voltage difference between junction 37 and bus 32 will increase or decrease, respectively, the current flow rate through timing capacitor 42. The maximum frequency is controlled by adjusting the main frequency variable resistor 39.

When the voltage across timing capacitor 42 increases sufficiently, the emitter of unijunction transistor 43 will be biased so that it will conduct. Capacitor 42 will discharge through transistor 43 and resistor 44, and the voltage developed across resistor 44 will turn on the Darlington-connected transistors 45 and 46 to drive the primary 47 of pulse transformer 48. The pulse transformer has two isolated secondaries, secondary winding 49 being connected to the gate and cathode of the main SCR 18 to apply gate pulses thereto and secondary winding 50 being connected to apply simultaneous gate pulses to the gate and cathode of charging SCR 22.

After timing capacitor 42 discharges through transistor 43, transistor 43 will turn off and capacitor 42 will begin charging again to generate another current pulse to pulse transformer 48. The pulse frequency of the main oscillator will be directly related to the potential at junction 37.

The frequency of the main oscillator is controlled by variable resistor 51 (typically actuated by a foot-controlled accelerator pedal, not shown) connected in series with resistors 52a and 52b between ground and the 12.4-volt bus 32. The voltage at junction 54 between resistors 52a and 52b will thus be dependent upon the setting of variable resistor 51. Junction 54 is connected to a voltage divider made up of resistors 53a and 53b, the junction of which is connected to the inverting input of differential amplifier 55. The non-inverting input is connected to a voltage divider made up of resistors 57a and 57b.

The voltage at the output terminal of differential amplifier 55 is a function of the voltage difference at its inverting and non-inverting inputs. If the inverting input is positive with respect to the non-inverting input the output of amplifier 55 will be low and very nearly equal to zero. When the inverting input is negative with respect to the non-inverting input the output of amplifier 55 will be high and very nearly equal to 12.4 volts. Because no feedback is used around amplifier 55 directly, its gain is its intrinsic open loop gain which is very high (greater than 50,000 v/v). This high gain causes the output of amplifier 55 to switch from high to low output levels with exceedingly small input voltage differences.

The voltage dividers made up of resistors 53a and 53b, 57a and 57b have the resistors 53b and 57a connected to the 6.2 v. bus 56 which is used as a signal common. Voltage divider resistor 57b is connected to the output of integrator amplifier 62. The non-inverting input of amplifier 62 connected through resistor 63 to the signal common (+6.2 volts). The integrating capacitor 58, connected between the output and inverting input of amplifier 62 charges through resistor 60 and diode 61 or discharges through diode 64 and resistor 65 depending upon the output polarity of amplifier 55 with respect to the signal common bus (+6.2 volts).

The output of integrator 62 with respect to signal common, i.e., +6.2-volt bus 56, is:

$$V_{out} = \frac{1}{RC} \int_0^t V_{in} dt,$$

where
- $R$ = resistor 65 or 60 depending on the polarity of the output of amplifier 55 with respect to signal common,
- $C$ = capacitor 58,
- $V_{in}$ = output voltage of amplifier 55 when the output is negative with respect to signal common or the voltage at the junction of resistors 59 and 60 when the output is positive.

Since the voltage $V_{in}$ is a fixed high or low level, the output, $V_{out}$, of integrator 62 is a linear ramp because the integral of a constant is a constantly increasing value. The slope of the ramp will depend on whether capacitor 58 is charging through resistor 60 or discharging through resistor 65.

The feedback connection, through voltage divider resistor 57b, from the output of integrator amplifier 62 to the non-inverting input of the differential amplifier 55 causes amplifier 55 to use a scaled output of amplifier 62 as a reference. The two amplifiers are connected such that when a voltage difference exists between the inputs of amplifier 55 and causes the integrator amplifier to change its output, the change is in a direction to cause the difference to reduce to zero. As a result, the integrator output will go to and then stabilize at a level which is dependent upon the level at the inverting input of differential amplifier 55. Since the level at inverting input of amplifier 55 is dependent upon the setting of the foot-actuated variable resistor 51, the output level of amplifier 62 will also be dependent thereon.

When the accelerator pedal is depressed, the voltage level at the inverting input of amplifier will decrease. The negative difference between the inverting and non-inverting inputs of amplifier 55 will cause its output to go high. Integrating capacitor 58 charges through resistor 60 and diode 61 and causes integrator 62 to develop a negatively-going voltage ramp at its output having a slope dependent upon the values of capacitor 58 and resistor 60. When the output of amplifier 62 lowers sufficiently so that the feedback voltage to the non-inverting input of amplifier 55 reduces the level thereat to the level of the inverting input, the negative-going ramp stops and the output of amplifier 62 stabilizes at the level which maintains a zero difference between the inputs of amplifier 55.

Similarly, if the accelerator pedal is released, the voltage level at the inverting input of amplifier will increase, causing the output of amplifier 55 to go low. Integrating capacitor 58 discharges through diode 64 and resistor 65 and causes integrator amplifier to ramp positively, the ramp having a slope dependent on the value of resistor 65 through which current is flowing. The increasing voltage is fed back to amplifier 55 so that its non-inverting input level increases. When that level reaches the level of the inverting input the ramp stops and the output of amplifier 62 remains at this level which will maintain a zero difference between the inputs of amplifier 55.

Thus, the output of integrator amplifier 62 will follow changes in the setting of the accelerator control 51 but at a linear rate. The maximum rate of change of the integrator output is determined by the RC constants of the integrating circuits and thus prevent the main oscillator from abruptly changing its pulse rate if the accelerator control is abruptly depressed or released. The resistance value of resistor 60 is relatively large as compared to the value of resistor 65 so that a relatively long acceleration time and a relatively short deceleration time is provided.

Closing of either direction switch 12 or 13 will complete a current path through diode 66 or 67, resistor 68, diode 69 and resistor 70, which turns transistor 71 on and thus turns off transistor 72. If the closed direction switch is then opened, the bias on the base of transistor 71 is removed, turning it off and thereby turning transistor 72 on. With the transistor 72 conducting, the base of unijunction transistor 43 is grounded through diode 73 and transistor 72 so that no more pulses can be delivered to the gate of the main SCR 18. Thus, when the direction relay F or R de-energizes in response to the opening of the direction switch it will not break current and the vehicle will not lurch. Timing capacitor 42 will likewise be grounded and reset.

Also, when transistor 72 is turned on in response to opening of a closed direction switch 12 or 13, the non-inverting input of differential amplifier 55 will be grounded through diode 75 and transistor 72. With the inverting input now higher than the grounded non-inverting input, the output of amplifier 55 will go low, in turn causing the output of integrator amplifier 62 to increase to a high level. Since the rate of gating the main SCR 18 on is inversely proportional to the level of the output of amplifier 62, operation will commence at "creep" speed when transistor 72 is subsequently turned off, in response to closing of a direction switch, and timing capacitor 42 is again allowed to charge. Thus, when the operator wishes to reverse direction by opening one direction switch and closing the other, this circuit will ensure a start-up in the creep mode.

Similarly, if the vehicle is accelerated to the bypass mode by closing the bypass switch 25, the auxiliary bypass contact BP2 will, through diode 74, ground and remove the bias from the base of transistor 71 so that it turns off, to turn transistor 72 on, to discharge and reset the timing capacitor 42. Thus, when the vehicle comes out of the bypass mode, the main oscillator is in condition to start generation of gate pulses again. Even though the output of amplifier 62 will have gone high during the time that the vehicle is in the bypass mode, so that the main oscillator will start up at creep frequency when the vehicle comes out of bypass, this will have little noticeable effect on operation since a partial or full release of the accelerator control will cause the vehicle to coast under its momentum and slow itself to the speed of the new demand setting of the accelerator control. During this period of coasting the output of amplifier 62 will decrease to the level established by the new setting of the accelerator control.

What is claimed is:

1. In a system for controlling the power from a source of direct current to a motor, said system including a silicon controlled rectifier connected in series with said source and said motor to supply current from said source to said motor when said silicon controlled rectifier is gated into conduction, a commutating circuit for commutating said silicon controlled rectifier at a controlled time after said silicon controlled rectifier has been gated into conduction, a relay having main contacts for connecting said field and armature in series when said relay is energized, and an energizing circuit including a switch for energizing said relay, the improvement comprising:

a. a chargeable and dischargeable timing capacitor,
b. means for producing a reference voltage, including operator-controllable means for varying the level of said reference voltage,
c. means for charging said timing capacitor at a constant current rate which is proportional to the level of said reference voltage,
d. means responsive to a predetermined rise in charging voltage across said timing capacitor for concurrently discharging said capacitor and producing a pulse,
e. means for utilizing said pulse to gate the silicon controlled rectifier into conduction,
f. means for delaying charging of said capacitor for a predetermined time following energization of said relay and actuation of the contacts associated therewith.

2. In a system as set forth in claim 1, wherein said means (f) includes:
circuit means through said switch for supplying power derived from said source of direct current to said timing capacitor following closure of said switch,
delay means in said circuit means for delaying the application of said power to said timing capacitor following closure of said switch.

3. In a system as set forth in claim 1, wherein said means (f) includes:
normally open auxiliary contacts actuated by said relay to closed position when said relay is energized,
circuit means for supplying power derived from said source of direct current through said auxiliary contacts to said timing capacitor to cause charging thereof,
delay means in said circuit means for delaying the application of said power to said timing capacitor following closure of said auxiliary contacts.

4. In a system as set forth in claim 3, the improvement further comprising:
second auxiliary contacts actuated by said relay from a first position to a second position when said relay is closed,
means responsive to the position of said second auxiliary contacts for allowing said timing capacitor to charge when said contacts are in their second position and for preventing said timing capacitor from charging when said contacts are in said first position.

5. In a system for controlling the power from a source of direct current to a motor, said system including a silicon controlled rectifier connected in series with said source and said motor to supply current from said source to said motor when said silicon controlled rectifier is gated into conduction, a commutating circuit for commutating said silicon controlled rectifier at a controlled time after said silicon controlled rectifier has been gated into conduction, a relay having main contacts for connecting said field and armature in series when said relay is energized, and an energizing circuit including a switch for energizing said relay, said switch having a first position for completing said energizing circuit and a second position opening said circuit, the improvement comprising:

a. a chargeable and dischargeable timing capacitor,
b. means for producing a reference voltage, including operator-controllable means for varying the level of said reference voltage,
c. means for charging said timing capacitor at a constant current rate which is proportional to the level of said reference voltage,
d. means responsive to a predetermined rise in charging voltage on said timing capacitor for concurrently discharging said capacitor and producing a pulse,
e. means utilizing said pulse to gate the silicon controlled rectifier into conduction,
f. means responsive to an opening of said energizing circuit for discharging said timing capacitor prior to de-energization of said relay.

6. In a system as set forth in claim 5, wherein said means (f) includes:
means responsive to the position of said switch for allowing said timing capacitor to charge when said switch is in said first position and for preventing said timing capacitor from charging when said switch is in said second position.

7. In a system as set forth in claim 6 in which said system further includes a bypass relay having main contacts for connecting said source of direct current directly to said motor when said bypass relay is energized, the improvement further comprising:
auxiliary bypass contacts actuated by said bypass relay from a first position to a second position when said bypass relay is energized,
means responsive to the position of said auxiliary bypass contacts for allowing said timing capacitor to charge when said contacts are in their first position and for preventing said timing capacitor from charging when said contacts are in their second position.

8. In a system as set forth in claim 7, wherein the means responsive to the second position of said switch and the means responsive to the second position of the auxiliary bypass contacts both discharge said timing capacitor and maintain said timing capacitor discharged.

9. In a system for controlling the rate of application of power from a source of direct current to a load, said system including a silicon controlled rectifier in series with said source and said load when said silicon controlled rectifier is gated into conduction, a commutating circuit for commutating said silicon controlled rectifier at a controlled time after said silicon controlled rectifier has been gated into conduction, the improvement comprising:

a. a direct-current voltage source,
b. an operator-controllable variable resistor connected across said voltage source,
c. a differential amplifier having inverting and non-inverting inputs and an output,
d. means for applying a voltage to one of said inputs of said differential amplifier which voltage has a level dependent on the setting of said variable resistor, e. an integrator amplifier having inverting and non-inverting inputs and an output,
f. a reference voltage connected to one of said inputs of said integrator amplifier,
g. resistance means connected from the output of said integrator amplifier to one side of said voltage source,
h. an integrating capacitor connected between the other of said inputs and the output of said integrator amplifier,
i. resistance means connected from the output of said differential amplifier and said other input of said integrator amplifier,
j. feedback means connecting the output of said integrator amplifier to the other of said inputs of said differential amplifier,
k. means for generating pulses to gate on said silicon controlled rectifier at a rate dependent on the level of voltage developed across said resistance means (g).

10. In a system as set forth in claim 9 wherein there is no direct feedback from the output of said differential amplifier to said one input thereof.

11. In a system as set forth in claim 9, wherein said resistance means (i) includes:
first and second resistors each connected between the output of said differential amplifier and said other input of said integrator amplifier,
means for allowing current flow through said first resistor when and only when said output of said differential amplifier is more positive than said other input of said integrator amplifier and for allowing current flow through said second resistor when said output of said differential amplifier is more negative than said other input of said integrator amplifier.

12. In a system as set forth in claim 9, wherein said resistance means (i) includes:
a first resistor and a first diode connected in series with each other from the output of said differential amplifier to said other input of said integrator amplifier,
a second resistor and a second diode connected in series with each other from the output of said differential amplifier to said other input of said integrator amplifier,
said first and second diodes being oppositely poled relative to each other.

13. In a system as set forth in claim 9 wherein said load is a motor and wherein said system includes a relay having main contacts for connecting the field and armature in series when said relay is energized, and an energizing circuit including a switch for energizing said relay, said switch having a first position for completing said energizing circuit and a second position opening said circuit, the improvement further comprising:
l. means responsive to the position of said switch for connecting said other input of said differential amplifier to the other side of said voltage source (a) when said switch is in its second position and for removing such connection when said switch is in its first position.

14. In a system as set forth in claim 13, wherein said means (1) further includes means for disabling said pulse-generating means (k) when said switch is in its second position and for allowing said pulse-generating means (k) to operate when said switch is in its first position.

* * * * *